April 3, 1945.　　　　F. WINTERS　　　　2,372,922
CLUTCH CLASP FOR STUDDED BUTTONS, ETC
Filed Dec. 18, 1942　　　　2 Sheets-Sheet 1
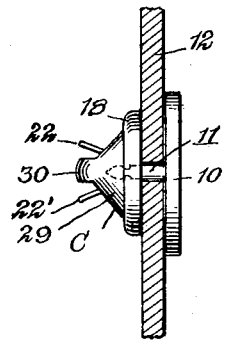
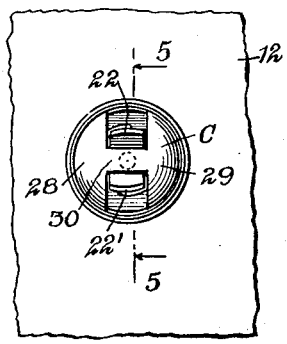
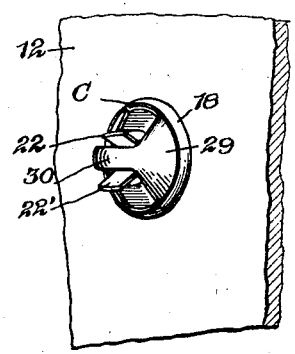
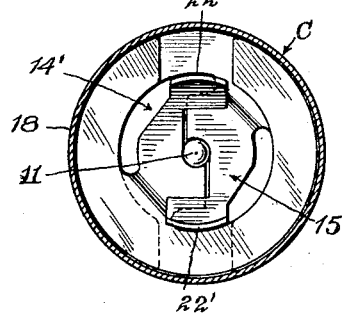
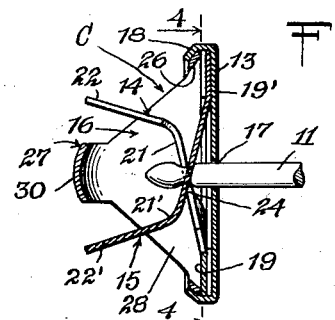
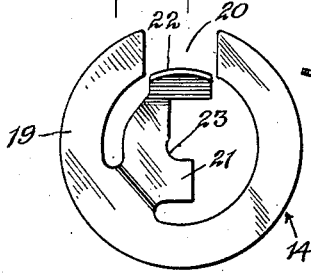
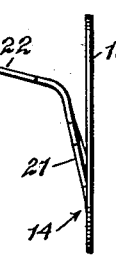
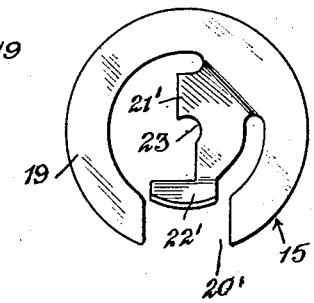
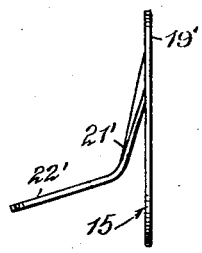
INVENTOR
Frank Winters
BY
James Franklin
ATTORNEY April 3, 1945.   F. WINTERS   2,372,922
CLUTCH CLASP FOR STUDDED BUTTONS, ETC
Filed Dec. 18, 1942   2 Sheets-Sheet 2
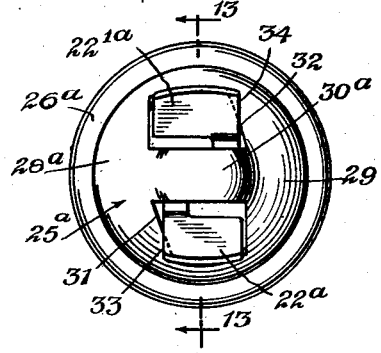
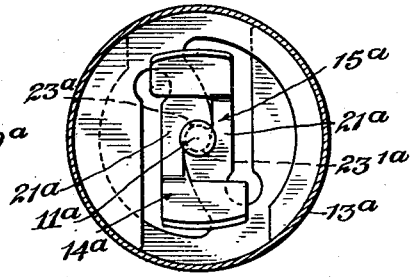
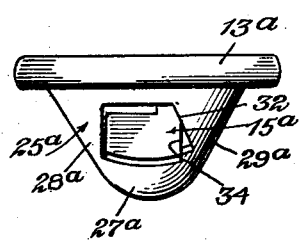
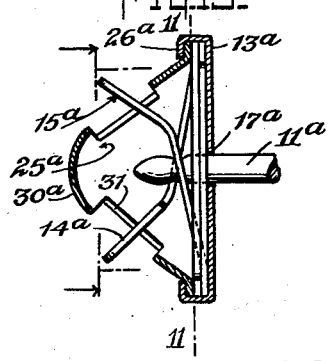
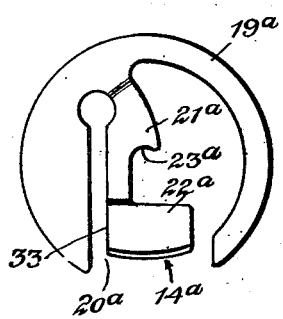
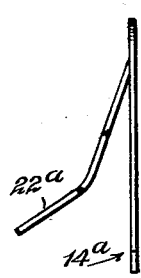
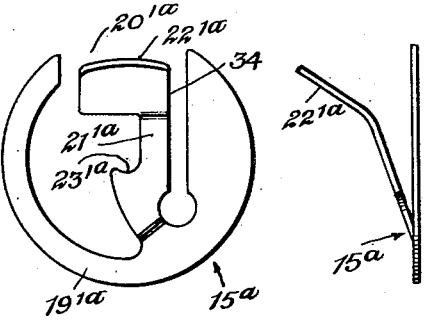
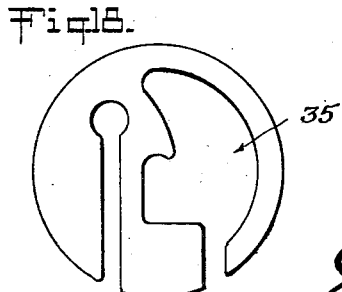
INVENTOR
Frank Winters
BY
James & Franklin
ATTORNEYS Patented Apr. 3, 1945

2,372,922

UNITED STATES PATENT OFFICE 2,372,922

CLUTCH CLASP FOR STUDDED BUTTONS, ETC.

Frank Winters, Larchmont, N. Y., assignor to Rex Products Corporation, New Rochelle, N. Y., a corporation of New York Application December 18, 1942, Serial No. 469,393

2 Claims. (Cl. 24—217)

This invention relates to an improved clasp for studded buttons, insignia, emblems and the like.

The prime object of my present invention centers about the provision of an efficient, easily operable and durable clasp for studded buttons, emblems, insignia and the like, which may be manufactured at an exceedingly low cost.

The principal desiderata in such a clasp are the following: (1) efficiency in performing its main purpose, namely, in securely and safely holding the button, insignia, emblem or similar device; (2) ease of operation, that is, the ability to be readily and in fact instantly attachable to and detachable from the device to be secured thereby; (3) durability, particularly the ability of being repeatedly operated with continuing efficiency; and (4) the manufacturability by simple punch press stamping operations so that the same may be manufactured rapidly and at an exceedingly low cost. The improved clasp of my present invention satisfies each of these desiderata to a high degree.

To the accomplishment of these objects and such other objects as may hereinafter appear, my invention consists in the clutch type of clasp as hereinafter more particularly described in the specification and sought to be defined in the claims. The specification is accompanied by drawings in which:

Fig. 1 is a side elevational view of the clasp showing the manner of its use;

Fig. 2 is a front elevation of the same;

Fig. 3 is a perspective view of the same;

Fig. 4 is a view of the same on an enlarged scale taken in cross-section in the plane of the line 4—4 of Fig. 5;

Fig. 5 is a section elevational view thereof on an enlarged scale taken in cross-section in the plane of the line 5—5 of Fig. 2;

Fig. 6 is a front view of one of the clutch members of the clasp;

Fig. 7 is a side view thereof;

Fig. 8 is a front view of the other clutch member of the clasp;

Fig. 9 is a side view of the latter; and

Figs. 10 to 18 are views of a modification,

Fig. 10 being a plan view thereof;

Fig. 11 a view taken in cross-section in the plane of the line 11—11 of Fig. 13;

Fig. 12 is a vertical side elevational view thereof;

Fig. 13 is a view taken in cross-section in the planes of the broken lines 13—13 of Fig. 10;

Figs. 14 to 17 are front and side views of the clutch members thereof; and

Fig. 18 is a view of a punched out blank thereof.

Referring now more in detail to the drawings, I show in Figs. 1 to 3 the assembled clasp of my invention and the manner of its use. The clasp generally designated as C is intended for use with buttons, emblems, insignia or similar devices such as 10, provided with a centrally arranged stud 11 to which stud the clasp is adapted to be secured for holding the button, insignia or the like to the lapel of a coat or other part of an article of clothing designated as 12. The clasp C is constructed and designed to effectively secure the studded button, insignia or other emblem in position and to be operable instantly for detachable attachment to the button stud.

To accomplish these objects as well as the others referred to, the clasp C of the present invention comprises a holder 13, a pair of finger operable clutch members generally designated as 14 and 15, respectively, and preferably a guard member generally designated as 16, each of these parts being made from sheet metal suitably contoured by simple manufacturing operations and assembled to form the clutch unit C.

The holder 13 comprises a simple disc or dished member centrally perforated at 17 to receive and support the stud 11 of the button or emblem and marginally flanged at 18 for the purpose of seating and securing the other parts of the clasp.

The critical parts of the clasp are the clutch members 14 and 15. The efficiency, ease of operability and durability of the clasp depend upon the construction and design of these clutch members. In accordance with the present invention, two separate clutch members are provided. The clutch member 14 separately shown in Figs. 6 and 7 of the drawings, comprises a marginal flat portion 19 which may be split or interrupted as at 20, a struck-up resilient clutch portion 19, and a finger grip portion 22 extending upwardly from said clutch portion. The clutch portion 21 is provided with a suitably contoured clutch forming edge 23 adapted to overlie the central perforation 17 in the holder 13. The other clutch member 15 separately shown in Figs. 8 and 9 of the drawings is the same as the clutch member 14 except that it is disposed or rotated 180° with respect to the clutch member 14; the parts of the clutch member 15 are all the same as the parts of the clutch member 14 and are indicated by similar but primed reference numerals. Each clutch member is stamped out and struck up from a piece of sheet metal.

The two clutch members 14 and 15 are assembled in the holder 13 as best indicated in Figs. 4 and 5 of the drawings. The flat marginal portions 19 and 19' of these members are arranged in overlying relation and are seated in and secured to the holder 13. The struck-up clutch portions 21 and 21' are arranged in opposed relation with the clutch edges 23 and 23' thereof in overlying registry with the central perforations 17 of the holder 13, whereby the clutch edges may resiliently and effectively grip the stud 11, which latter may be suitably grooved as at 24 for improving the grip. The finger portions 22 and 22' are adjacently disposed in nearly parallel relation as shown in Fig. 5, so that they may be gripped between the user's fingers to open and release the studded button or to permit attachment thereto. The provision of two similar but independent clutch members enables the parts to be made simply and with considerable accuracy and is an important factor in producing efficiency and ease of operation and durability.

Preferably, a guard member generally designated as 25 is also provided. This guard member also formed from suitable sheet stock, comprises a ring 26 and a struck-up or drawn-up guard portion 27. The ring 26 overlies the marginal portions 19 and 19' of the clutch members, and the marginal flange 18 of the holder 13 is pressed or swaged over these overlying parts to securely hold the guard and the clutch members in assembled relation. The guard part 27 has two wing portions 28 and 29 which partly encircle and thereby guard the clutch members connected by a top bridge portion 29 which lies between the upwardly protruding finger portions 22 and 22'. The guard thereby forms a partial housing for the clutch members and provides a stop means (at the bridge) for the opening movement of the clutch members.

In Figs. 10 to 18 I show a modification of the clasp of my invention, constructed and designed so that any tendency for relative slippage between the clasp and the clasped part of the button or insignia is effectively prevented by causing the parts to be more firmly gripped when such a tendency is present. This I accomplish by constructing the guard member and the clutch member in such a way that when the clutch members are urged to move towards the clasp holder (in response to a pull incident to a tendency for relative slippage between clasp and button stud), such movement will cause the clutch portions to bite into and thus more firmly engage the button stud, thereby effectively resisting or preventing such slippage. Aside from the modifying of these parts, the structure of Figs. 10 to 18 is otherwise the same as that of Figs. 1 to 9 and the parts thereof are designated by similar reference characters exponented by the letter *a*.

The guard member 25$^a$ is modified by so inclinngly cutting the edges 31 and 32 in the opposite wings 28$^a$ and 29$^a$, respectively, that they act, respectively, as camming edges for the respective edges 33 and 34 formed in the finger portions 22$^a$ and 22'$^a$ when the latter are depressed (towards the holder 13$^a$) beyond their normal state. The clutch members 14$^a$ and 15$^a$ are accordingly redesigned to a contour such as shown in Figs. 14 to 17, made from a blank generally designated as 35 and shown separately in Fig. 18.

It follows from this modified construction that any tendency towards relative slippage between the stud 11$^a$ and the clasp will translate itself to an urged movement of the clutch portions of the members 14$^a$ and 15$^a$ towards the holder 13$^a$, whereupon the edges 33 and 34 of the clutch portions will come into engagement with the camming edges 31 and 32 of the guard member, causing the clutch portions to twist torsionally (pivoting about their points of emergence from the marginal portions of the clutch members) in such a way that the clutching edges 23$^a$ and 23'$^a$ bite into and more firmly engage the stud 11$^a$ resisting and effectively preventing this slippage. This, however, does not interfere with the opening movements of the clutch members as will be evident from viewing Figs. 10 and 13 of the drawings.

The clutch clasp of my present invention, the method of making the same and the improved functions and advantages obtained therewith will, in the main, be fully apparent from the above detailed description thereof. The clutch clasp produced is efficient in its function, is capable of simple and rapid operation, is durable in use and is manufacturable at a low cost.

I claim:

1. A clutch clasp for studded buttons, insignia and the like, comprising a centrally perforated marginally flanged holder, a pair of finger operable clutch members and a guard member in said holder, each clutch member consisting of the following parts formed from a piece of sheet metal; a marginal flat portion secured to said holder, a struck-up resilient clutch portion extending from one side of said marginal portion, and a finger grip portion extending from said clutch portion, the clutch portion being provided with a contoured clutch forming edge overlying the central perforation in the holder, the two clutch members being disposed with their marginal portions overlying and with their struck-up portions in opposed relation 180° one with respect to the other, whereby the marginal portions are secured to said holder while the clutch portions are disposed in mating relation to engage the stud of the button or insignia received by said holder and the finger portions are adjacently disposed for being gripped by the user's fingers, the said guard member having camming edges adapted to be engaged by said clutch portions when the latter are urged to move toward the holder, whereby upon such movement the clutch forming edges of the clutch portions more firmly engage the button stud.

2. A clutch clasp for studded buttons, insignia and the like, comprising a centrally perforated marginally flanged holder and finger operable clutch members and a guard member in said holder, the clutch members consisting of the following parts: marginal flat portions secured to said holder, struck-up resilient clutch portions extending from opposite sides of said marginal portions, and a finger grip portion extending from each clutch portion, the clutch portions being provided with oppositely arranged contoured clutch forming edges overlying the central perforation in the holder, whereby the clutch portions are disposed in mating relation to engage the stud of the button or insignia received by said holder and the finger portions are adjacently disposed for being gripped by the user's fingers, the said guard member having camming edges adapted to be engaged by said clutch portions when the latter are urged to move toward the holder, whereby upon such movement the clutch forming edges of the clutch portions more firmly engage the button stud.

FRANK WINTERS.